US009046958B2

(12) United States Patent  
Colley et al.

(10) Patent No.: US 9,046,958 B2  
(45) Date of Patent: Jun. 2, 2015

(54) METHOD, APPARATUS AND COMPUTER PROGRAM PRODUCT FOR USER INPUT INTERPRETATION AND INPUT ERROR MITIGATION

(75) Inventors: Ashley Colley, Oulu (FI); Juha Matero, Fleet (GB)

(73) Assignee: Nokia Technologies Oy, Espoo (FI)

( * ) Notice: Subject to any disclaimer, the term of this patent is extended or adjusted under 35 U.S.C. 154(b) by 521 days.

(21) Appl. No.: 13/421,660

(22) Filed: Mar. 15, 2012

(65) Prior Publication Data

US 2013/0246861 A1    Sep. 19, 2013

(51) Int. Cl.
    *G06F 3/041*     (2006.01)
    *G06F 3/0488*     (2013.01)

(52) U.S. Cl.
    CPC ............ *G06F 3/0418* (2013.01); *G06F 3/0488* (2013.01)

(58) Field of Classification Search
None
See application file for complete search history.

(56) References Cited

U.S. PATENT DOCUMENTS

| | | | |
|---|---|---|---|
| 5,973,676 A | 10/1999 | Kawakura | |
| 2005/0030291 A1* | 2/2005 | Yanagisawa | 345/173 |
| 2006/0244735 A1* | 11/2006 | Wilson | 345/173 |
| 2009/0225044 A1* | 9/2009 | Jeon et al. | 345/173 |
| 2010/0033441 A1* | 2/2010 | Park et al. | 345/173 |
| 2010/0139990 A1 | 6/2010 | Westerman et al. | |
| 2011/0193797 A1 | 8/2011 | Unruh | |
| 2011/0242032 A1* | 10/2011 | Seo et al. | 345/173 |
| 2012/0019459 A1* | 1/2012 | Moon et al. | 345/173 |
| 2012/0194452 A1* | 8/2012 | Cho et al. | 345/173 |
| 2013/0222276 A1* | 8/2013 | Kim et al. | 345/173 |

FOREIGN PATENT DOCUMENTS

WO    WO-2012/002894 A1    1/2012

OTHER PUBLICATIONS

Matero, J., et al.; "*Identifying Unintentional Touches on Handheld Touch Screen Devices*;" Proceedings of the Designing Interactive Systems Conference; dated 2012.
International Search Report and Written Opinion for Application No. PCT/FI2013/050286; dated Jun. 21, 2013.

* cited by examiner

*Primary Examiner* — Jason Olson
(74) *Attorney, Agent, or Firm* — Alston & Bird LLP

(57) ABSTRACT

Provided herein are a method, apparatus and computer program product for interpreting user input and mitigating erroneous inputs on a device. In particular, methods may include receiving an indication of a first touch event, determining, by a touch mediation function, if the first touch event is an erroneous touch event, causing the first touch event to be sent to an application in response to the touch mediation function determining that the touch event is not erroneous; and causing the first touch event to not be sent to the application in response to the touch mediation function determining that the first touch event is erroneous. The first touch event may occur proximate a first capture area for the user interface and the method may further include causing the first capture area for the user interface to be adjusted in response to the first touch event.

20 Claims, 11 Drawing Sheets

METHOD, APPARATUS AND COMPUTER PROGRAM PRODUCT FOR USER INPUT INTERPRETATION AND INPUT ERROR MITIGATION

TECHNOLOGICAL FIELD

Example embodiments of the present invention relate generally to a user interface of a device, and more particularly, to a method, apparatus, or computer program product for interpreting user input to distinguish between unintended input and intentional input.

BACKGROUND

The modern communications era has brought about a tremendous expansion of wireline and wireless networks. Computer networks, television networks, and telephone networks are experiencing an unprecedented technological expansion, fueled by consumer demand. Wireless and mobile networking technologies have addressed consumer demands while providing more flexibility and immediacy of information transfer.

Mobile devices, such as cellular telephones, have become smaller and lighter while also becoming more capable of performing tasks that far exceed a traditional voice call. Mobile devices are becoming small, portable computing devices that are capable of running a variety of applications, some of which benefit from a larger display. These devices are comparable in capabilities to laptop or desktop-type computers such that they can execute thousands of available applications. The portability of such devices may be enhanced by reducing their size, and hence, their display size. Limited display size may limit the available area in which inputs may be received, particularly in embodiments including touch screen inputs. Therefore, small displays may be conducive to accidental and unintended inputs. As such, it may be desirable to reduce the likelihood of accidental and unintended inputs.

SUMMARY

In general, an example embodiment of the present invention provides an improved method of user input interpretation and mitigation of erroneous inputs in a device. In particular, a method of example embodiments may include receiving an indication of a first touch event, determining, by a touch mediation function, if the first touch event is an erroneous touch event, causing the first touch event to be sent to an application in response to the touch mediation function determining that the touch event is not erroneous; and causing the first touch event to not be sent to the application in response to the touch mediation function determining that the first touch event is erroneous. The first touch event may occur proximate a first capture area for the user interface and the method may further include causing the first capture area for the user interface to be adjusted in response to the first touch event.

Methods according to example embodiments of the invention may further include receiving an indication of a second touch event, wherein determining, by the touch mediation function if the first touch event is erroneous may include assigning a priority to each of the first touch event and the second touch event, and determining that the touch event with the lower priority is erroneous. The indication of the second touch event may be received within a predetermined amount of time of receiving the indication of the first touch event. The first touch event may be received at a first capture area corresponding to a first priority area and the second touch event may be received at a second capture area corresponding to a second priority area, and the priority of the first touch event may correspond to the priority of the first priority area and the priority of the second touch event may correspond to the priority of the second priority area. The touch mediation function may include a touch event map layer and the touch event map layer may include at least two priority levels mapped to at least two areas of the touch screen interface. The first touch event may correspond to first prioritization parameters. Methods of example embodiments may further include adjusting a touch event parameter of at least one user interface component in response to receiving the first touch event.

Example embodiments of the invention may provide an apparatus including at least one processor and at least one memory including computer program code. The at least one memory and the computer program code configured to, with the at least one processor, cause the apparatus to provide for receiving an indication of a first touch event, provide for determining, by a touch mediation function, if the first touch event is an erroneous touch event, provide for causing the first touch event to be sent to an application in response to the touch mediation function determining that the touch event is not erroneous, and provide for causing the first touch event to not be sent to the application in response to the touch mediation function determining that the first touch event is erroneous. The first touch event may occur proximate a first capture area for a user interface and the apparatus may further be caused to provide for adjusting the first capture area for the user interface in response to the first touch event.

An apparatus according to example embodiments of the present invention may further be caused to receive an indication of a second touch event, where determining, by the touch mediation function, if the first touch event is an erroneous touch event may include assigning a priority to each of the first touch event and the second touch event, and determining that the touch event with the lower priority is erroneous. The indication of the second touch event may be received within a predetermined amount of time of receiving the indication of the first touch event. The first touch event may be received at a first capture area corresponding to a first priority area and the second touch event may be received at a second capture area corresponding to a second priority area, where the priority of the first touch event may correspond to the priority of the first priority area and where the priority of the second touch event may correspond to the priority of the second priority area. The touch mediation function may include a touch event map layer where the touch event map layer includes at least two priority levels mapped to at least two areas of a touch screen interface. The first touch event may correspond to first prioritization parameters. An apparatus according to example embodiments may further be configured to adjust touch event parameters of at least one user interface component in response to receiving the first touch event.

Embodiments of the present invention may provide a computer program product including at least one non-transitory, computer-readable storage medium having computer executable program code instructions stored therein. The computer executable program code instructions may include program code instructions for receiving an indication of a first touch event, program code instructions for determining, by a touch mediation function, if the first touch event is an erroneous touch event, program code instructions for causing the first touch event to be sent to an application in response to the touch mediation function determining that the first touch event is not erroneous, and program code instructions for causing the first touch event to not be sent to the application in response to the touch mediation function determining that the touch event is not erroneous. The first touch event may occur proximate a first capture area for a user interface and where the computer program product may further include program code instructions for causing the first capture area for the user interface to be adjusted in response to the first touch event.

A computer program product according to example embodiments of the present invention may further include program code instructions for receiving an indication of a second touch event, where the program code instructions for determining, by the touch mediation function, if the first touch event is an erroneous touch event includes program code instructions for assigning a priority to each of the first touch event and the second touch event, and program code instructions for determining that the touch event with the lower priority is erroneous. The indication of the second touch event may be received within a predetermined amount of time of receiving the indication of the first touch event. The first touch event may be received at a first capture area corresponding to a first priority area and the second touch event may be received at a second capture area corresponding to a second priority area, where the priority of the first touch event corresponds to the priority of the first priority area and where the priority of the second touch event corresponds to the priority of the second priority area. The touch mediation function may include a touch event map layer and the touch event may player may include at least two priority levels mapped to at least two areas of the touch screen interface.

Example embodiments of the invention may provide an apparatus including means for receiving an indication of a first touch event, means for determining, by a touch mediation function, if the first touch event is an erroneous touch event, means for causing the first touch event to be sent to an application in response to the touch mediation function determining that the touch event is not erroneous, and means for causing the first touch event to not be sent to the application in response to the touch mediation function determining that the first touch event is erroneous. The first touch event may occur proximate a first capture area for a user interface and the apparatus may further include means for adjusting the first capture area for the user interface in response to the first touch event.

An apparatus according to example embodiments of the present invention may further include means for an receiving an indication of a second touch event, where the means for determining, by the touch mediation function, if the first touch event is an erroneous touch event may include means for assigning a priority to each of the first touch event and the second touch event, and means for determining that the touch event with the lower priority is erroneous. The indication of the second touch event may be received within a predetermined amount of time of receiving the indication of the first touch event. The first touch event may be received at a first capture area corresponding to a first priority area and the second touch event may be received at a second capture area corresponding to a second priority area, where the priority of the first touch event may correspond to the priority of the first priority area and where the priority of the second touch event may correspond to the priority of the second priority area. The touch mediation function may include a touch event map layer where the touch event map layer includes at least two priority levels mapped to at least two areas of a touch screen interface. The first touch event may correspond to first prioritization parameters.

A method of further example embodiments may include receiving an indication of a first touch event, receiving an indication of a second touch event, determining, by a touch mediation function, a priority of each of the first touch event and the second touch event, and causing the touch event with the higher priority to be sent to a user interface of an application. The first touch event may occur proximate a first capture area for the user interface and the method may include causing the first capture area for the user interface to be adjusted in response to the first touch event. Determining a priority of each of the first touch event and the second touch event may occur in response to the second touch event occurring within a predetermined amount of time of the first touch event.

Methods according to example embodiments of the invention may further include where the first touch event is directed to a first capture area and where the second touch event is directed to a second capture area that is different than the first capture area. The first capture area may correspond to a first priority area and the second capture area may correspond to a second priority area, where the priority of the first touch event may correspond to the priority of the first priority area and the priority of the second touch event may correspond to the priority of the second priority area. The touch mediation function may include a touch event map layer where the touch event map layer includes at least two priority levels mapped to at least two areas of a touch screen interface. The first touch event may correspond to first prioritization parameters and the second touch event may correspond to second prioritization parameters.

Example embodiments of the invention may provide an apparatus including at least one processor and at least one memory including computer program code. The at least one memory and the computer program code configured to, with the at least one processor, cause the apparatus to provide for receiving an indication of a first touch event, provide for receiving an indication of a second touch event, provide for determining, by a touch mediation function, a priority of each of the first touch event and the second touch event, and provide for causing the touch event with the higher priority to be sent to a user interface of an application. The first touch event may occur proximate a first capture area for the user interface and the apparatus may be caused to provide for adjusting the first capture area for the user interface in response to the first touch event. The determining of a priority of each of the first touch event and the second touch event may occur in response to the second touch event occurring within a predetermined amount of time of the first touch event.

An apparatus according to example embodiments of the present invention may further include where the first touch event is directed to a first capture area and the second touch event is directed to a second capture area that is different than the first capture area. The first capture area may correspond to a first priority area and the second capture area may correspond to a second priority area, where the priority of the first touch event may correspond to the priority of the first priority area and the priority of the second touch event may correspond to the priority of the second priority area. The touch mediation function may include a touch event map layer, where the touch event map layer includes at least two priority levels mapped to at least two areas of a touch screen interface. The first touch event may correspond to first prioritization parameters and the second touch event may correspond to second prioritization parameters.

Embodiments of the present invention may provide a computer program product including at least one non-transitory, computer-readable storage medium having computer executable program code instructions stored therein. The computer executable program code instructions may include program code instructions for receiving an indication of a first touch event, program code instructions for receiving an indication of a second touch event, program code instructions for determining, by a touch mediation function, a priority of each of the first touch event and the second touch event, and program code instructions for causing the touch event with the higher priority to be sent to a user interface of an application. The first touch event may occur proximate a first capture area for the user interface and the computer program product may further include program code instructions for causing the first capture area for the user interface to be adjusted in response to the first touch event. The program code instructions for determining a priority of each of the first touch event and the second touch event may be executed in response to the second touch event occurring within a predetermined amount of time of the first touch event.

A computer program product according to example embodiments of the present invention may further include where the first touch event is directed to a first capture area and the second touch event is directed to a second capture area that is different than the first capture area. The first capture area may correspond to a first priority area and the second capture area may correspond to a second priority area, where the priority of the first touch event corresponds to the priority of the first priority area and the priority of the second touch event corresponds to the priority of the second priority area. The touch mediation function may include a touch event map layer and the touch event map layer may include at least two priority levels mapped to at least two areas of a touch screen interface.

Example embodiments of the invention may provide an apparatus including means for receiving an indication of a first touch event, means for receiving an indication of a second touch event, means for determining, by a touch mediation function, a priority of each of the first touch event and the second touch event, and means for causing the touch event with the higher priority to be sent to a user interface of an application. The first touch event may occur proximate a first capture area for the user interface and the apparatus may include means for adjusting the first capture area for the user interface in response to the first touch event. The means for determining of a priority of each of the first touch event and the second touch event may be implemented in response to the second touch event occurring within a predetermined amount of time of the first touch event.

An apparatus according to example embodiments of the present invention may further include where the first touch event is directed to a first capture area and the second touch event is directed to a second capture area that is different than the first capture area. The first capture area may correspond to a first priority area and the second capture area may correspond to a second priority area, where the priority of the first touch event may correspond to the priority of the first priority area and the priority of the second touch event may correspond to the priority of the second priority area. The touch mediation function may include a touch event map layer, where the touch event map layer includes at least two priority levels mapped to at least two areas of a touch screen interface. The first touch event may correspond to first prioritization parameters and the second touch event may correspond to second prioritization parameters.

DRAWINGS

Having thus described certain embodiments of the invention in general terms, reference will now be made to the accompanying drawings, which are not necessarily drawn to scale, and wherein:

DETAILED DESCRIPTION

Figure 1:
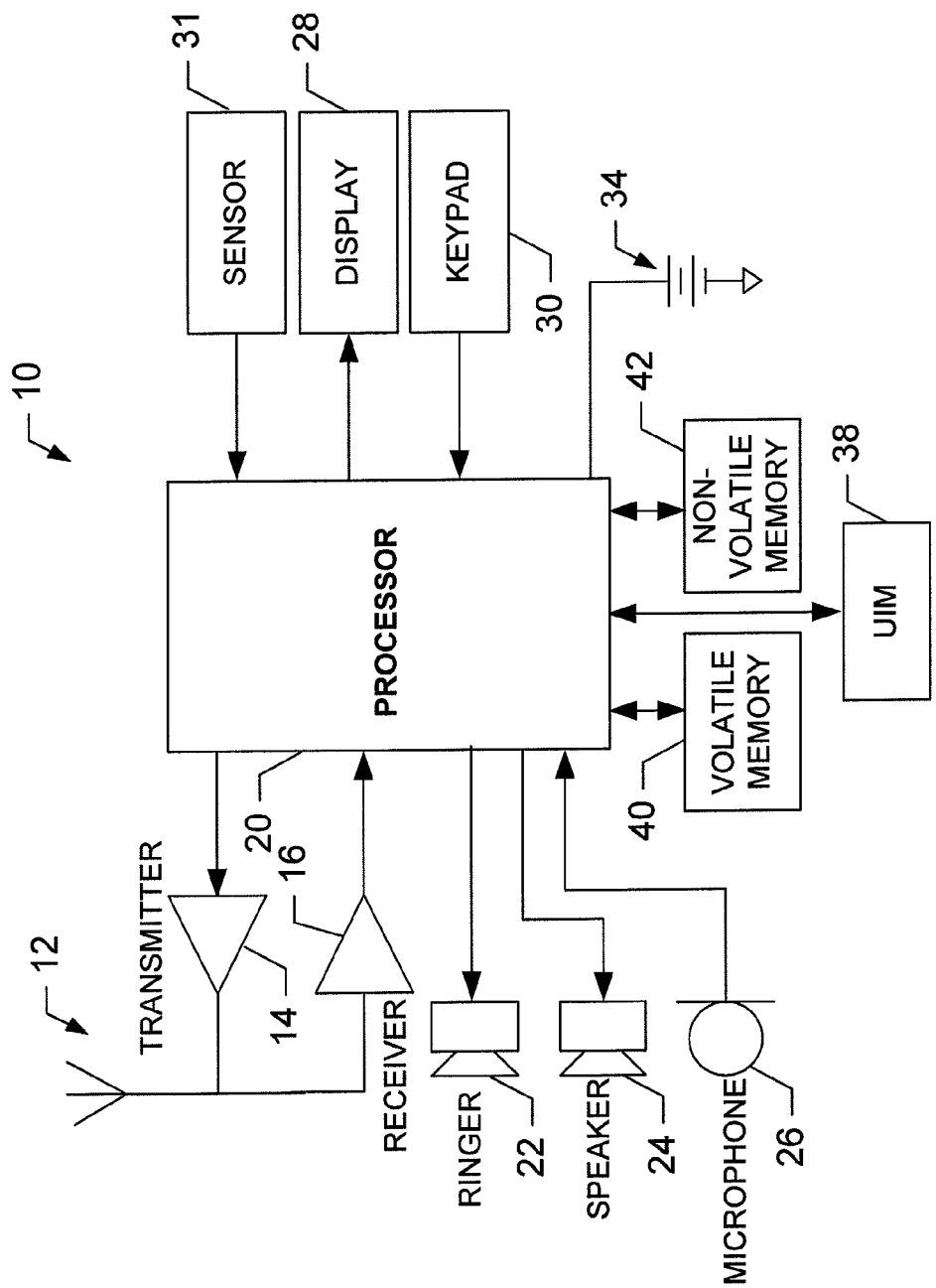
FIG. 1 is a schematic block diagram of a mobile terminal according to an example embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with some embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

Devices that may benefit from example embodiments of the present invention may include portable devices, such as tablet computers, cellular telephones, portable media devices, or the like, which are enhanced by a graphical user interface presented on a display, such as a touch screen. As portability of these devices often relates to their size, a smaller size may enhance portability while potentially sacrificing the available display area. However, touch screen displays generally provide an interactive user interface that requires accurate touches to be received in order to execute desired functions of a device. Therefore it may be desirable to improve the quality and consistency of inputs that are received on a touch screen user interface.

Some embodiments of the present invention may relate to a provision of a mechanism by which the user interface is enhanced by modifying a touch event through a touch mediation function to generate a modified touch event. The modified touch event may alter or correct an unintended or accidental touch event received at the user interface before the touch event is communicated as an input to the application logic.

One example embodiment of the invention is depicted in FIG. 1 which illustrates a block diagram of a mobile terminal 10 that would benefit from embodiments of the present invention. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as personal digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices may also employ some example embodiments.

The mobile terminal 10 may include an antenna 12 (or multiple antennas) in operable communication with a transmitter 14 and a receiver 16. The mobile terminal 10 may further include an apparatus, such as a processor 20 or other processing device (e.g., processor 70 of FIG. 2), which controls the provision of signals to and the receipt of signals from the transmitter 14 and receiver 16, respectively. The signals may include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the processor 20 may include circuitry desirable for implementing audio and logic functions of the mobile terminal 10. For example, the processor 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The processor 20 thus may also include the functionality to convolutionally encode and interleave message and data prior to modulation and transmission. The processor 20 may additionally include an internal voice coder, and may include an internal data modem. Further, the processor 20 may include functionality to operate one or more software programs, which may be stored in memory. For example, the processor 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the processor 20. The user input interface, which allows the mobile terminal 10 to receive data, may include any of a number of devices allowing the mobile terminal 10 to receive data, such as a keypad 30, a touch display (display 28 providing an example of such a touch display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch display may omit the keypad 30 and any or all of the speaker 24, ringer 22, and microphone 26 entirely. Additional input to the processor 20 may include a sensor 31. The sensor 31 may include one or more of a motion sensor, temperature sensor, light sensor, accelerometer, or the like. Forms of input that may be received by the sensor may include physical motion of the mobile terminal 10, whether or not the mobile terminal 10 is in a dark environment (e.g., a pocket) or in daylight, whether the mobile terminal is being held by a user or not (e.g., through temperature sensing of a hand). The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

Figure 2:
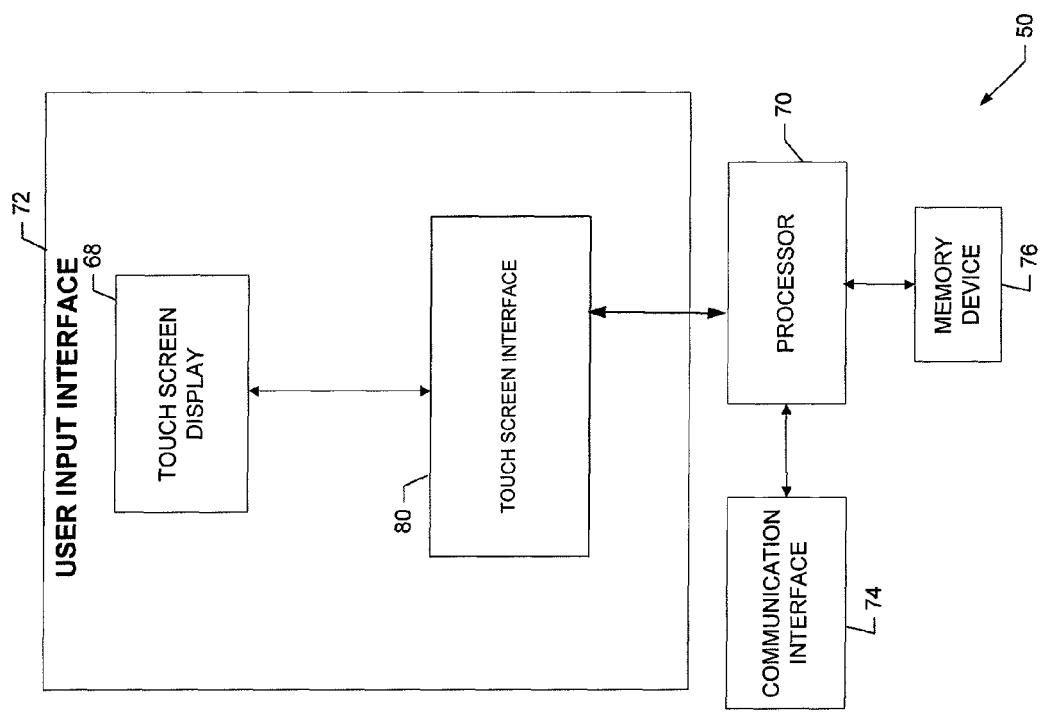
FIG. 2 is a schematic block diagram of an apparatus for providing a mechanism by which user input may be interpreted and input errors may be mitigated according to an example embodiment of the present invention.

An example embodiment of the present invention will now be described with reference to FIG. 2, in which certain elements of an apparatus 50 for managing information presented on a graphical user interface are illustrated. The apparatus 50 of FIG. 2 may be a device such as mobile terminal 10 of FIG. 1. However, it should be noted that the present invention may be embodied on any number of devices that include, or are otherwise in communication with displays.

The apparatus 50 may, in some embodiments, be a mobile terminal (e.g., mobile terminal 10) as illustrated in FIG. 1 or a computing device configured to employ an example embodiment of the present invention. However, in some embodiments, the apparatus 50 may be embodied as a chip or chip set that may be in communication with ancillary devices such as a touch screen display. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user input interface 72 may be in communication with the processor 70 to receive an indication of a user input at the user input interface 72 and/or to provide an audible, visual, mechanical or other output to the user. As such, the user input interface 72 may include, for example, a keyboard, a mouse, a joystick, a display, a touch screen(s), touch areas, device surfaces and/or sensors capable of detecting objects hovering over the surface, soft keys, a microphone, a speaker, motion sensor, temperature sensor, accelerometer, or other input/output mechanisms. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an example embodiment, the apparatus 50 may include or otherwise be in communication with a display, such as the illustrated touch screen display 68 (e.g., the display 28). In different example cases, the touch screen display 68 may be a two dimensional (2D) or three dimensional (3D) display. The touch screen display 68 may be embodied as any known touch screen display. Thus, for example, the touch screen display 68 could be configured to enable touch recognition by any suitable technique, such as resistive, capacitive, infrared, strain gauge, surface wave, optical imaging, dispersive signal technology, acoustic pulse recognition, etc. techniques. The user input interface 72 may be in communication with the touch screen display 68 to receive indications of user inputs at the touch screen display 68 and to modify a response to such indications based on corresponding user actions that may be inferred or otherwise determined responsive to the indications. In one alternative, a touch input may be provided other than by direct interaction with a display (e.g., in cases where the user interface is projected onto a wall with a projector, or where a cursor is used to direct input on the display).

In an example embodiment, the apparatus 50 may include a touch screen interface 80. The touch screen interface 80 may, in some instances, be a portion of the user input interface 72. However, in some alternative embodiments, the touch screen interface 80 may be embodied as the processor 70 or may be a separate entity controlled by the processor 70. As such, in some embodiments, the processor 70 may be said to cause, direct or control the execution or occurrence of the various functions attributed to the touch screen interface 80 (and any components of the touch screen interface 80) as described herein. The touch screen interface 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the touch screen interface 80 as described herein. Thus, in examples in which software is employed, a device or circuitry (e.g., the processor 70 in one example) executing the software forms the structure associated with such means.

The touch screen interface 80 may be configured to receive an indication of an input in the form of a touch event at the touch screen display 68. Optionally, a device may be configured to recognize a hovering input via the touch screen display 68 where a user may use a stylus or finger to hover over a capture area or otherwise interactive area and the device may be configured to recognize the hovering as an input, for example, by using touch screen interface 80. As such, the touch screen interface 80 may be in communication with the touch screen display 68 to receive indications of user inputs in the form of touch events at the touch screen display 68. The touch screen interface 80 may be configured to receive indications of a first touch event and a second touch event, determine the priority of each of the first touch event and the second touch event according to a touch mediation function, and cause the higher-priority touch event to be sent to a user interface of an application. The touch screen interface 80 and/or the processor 70 may be configured to implement the touch mediation function to determine the priority of received touch events. The application providing the user interface may receive the higher-priority touch event and execute a corresponding function accordingly. While the term "touch event" is used herein to describe a touch received at a touch screen display, it is appreciated that a "touch event" may include recognition of a hovering input as described above such that a physical touch of the display may not be necessary.

Figure 3:
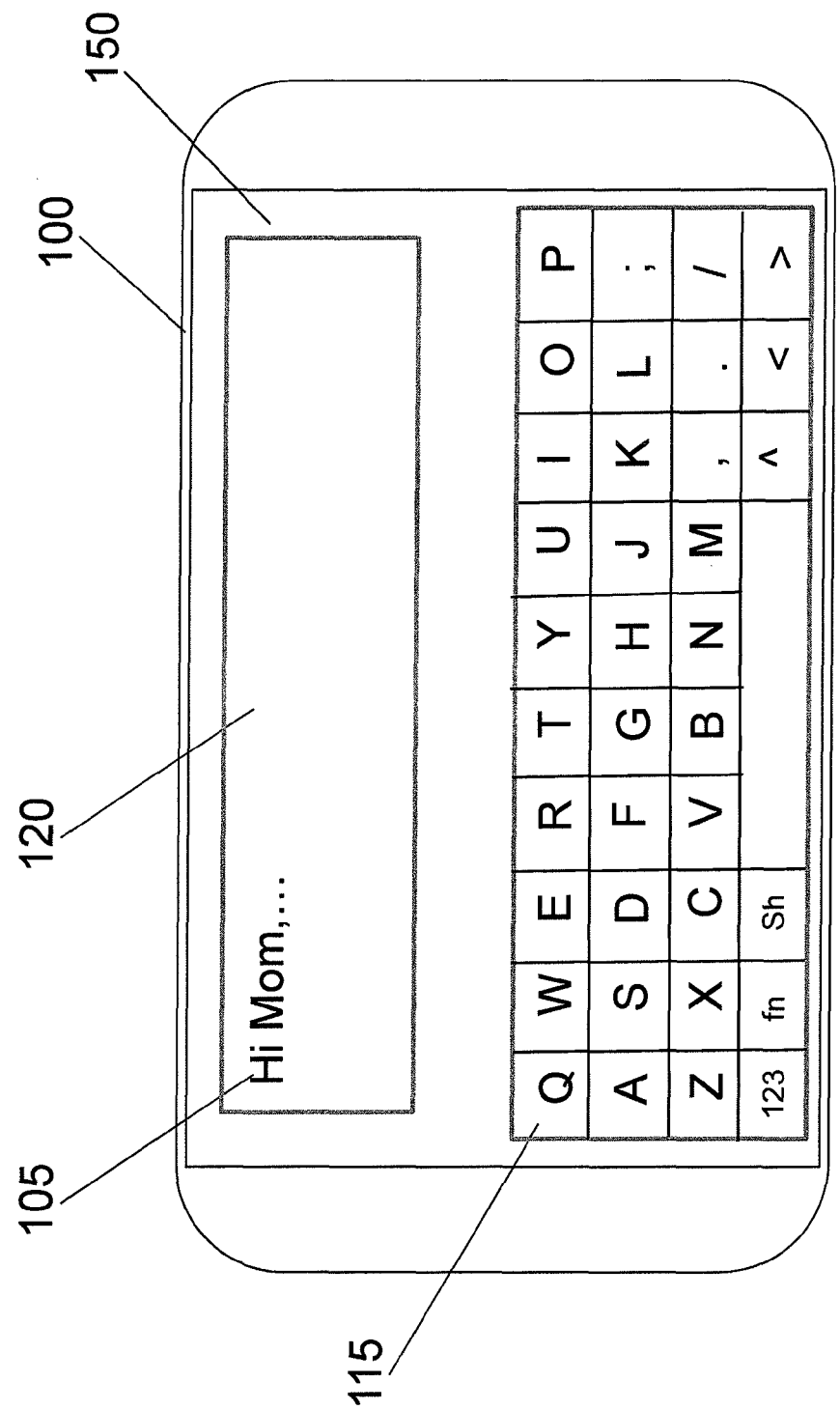
FIG. 3 is an illustration of a device displaying a plurality of a capture areas on a touch screen interface according to an example embodiment of the present invention.

FIG. 3 depicts a device 100, such as a mobile device (e.g., mobile terminal 10), that includes a display 150 for providing a mechanism by which user input may be interpreted and input errors may be mitigated. Devices 100 according to example embodiments of the present invention may be configured to display a user interface for an application with which a user may interact. In embodiments including a touch-screen display 150, a user may interact with the application or information by touching areas of the display which are configured to receive user input for a particular application. The interactive areas of the display may be referred to as capture areas which may vary in size, location, and number depending upon the application. The capture areas are part of the user interface provided by the application. In some embodiments, the entire display 150 may be divided into multiple capture areas whereas in other embodiments, only portions of the display 150 may be configured as capture areas. The entire display 150 may be capable of receiving a touch-input; however, the capture areas for each user interface of each application may vary depending upon the user interaction available within the application.

The illustrated embodiment of FIG. 3 depicts a touch screen display 150 with a virtual keypad 115 presented on the touch screen display 150 for entering text 105 into text window 120. This example may illustrate the text-input user interface for a number of applications, such as E-mail, text messaging, word processing, etc. In the illustrated embodiment, the keypad 115 includes virtual keys which each define a capture area corresponding to the letter or symbol with which they are associated. For example, a touch event received at a capture area corresponding to the letter "A" may cause an input to the application corresponding to typing the letter "A." The capture areas of the display 150 may include each key of the keypad 115 and the text window 120 in which a user may touch to place or move a cursor. Each key is a capture area of the text-input user interface shown and causes an interaction with the text-input user interface in response to receiving a touch event at the respective capture area.

As devices may be small to enhance portability, the capture areas of the user interface may be squeezed to fit in the display area, particularly when there are a large number of capture areas and a relatively small display. Capture areas may be small and may be adjacent to other capture areas such that a user usually needs to accurately touch a capture area in order to cause the input related to that capture area to occur.

Conventional user interface architectures generally pass touch events received at a capture area of a touch-screen directly to the user interface with the application. The virtual keys, buttons, or other input areas displayed on the device which serve as capture areas trigger the interaction related to the capture area in response to receiving a touch event at the capture area, without regard for possible accidental or unintended touches.

Accidental triggering of unwanted interaction when using a device with a touch-screen can result in user dissatisfaction and can cause unintended consequences, such as accidentally placing a call, misspelling words, or unintentionally navigating through a web page. Accidental triggering of unwanted interaction is particularly acute in a mobile device where the device is being operated with a single hand and the thumb of the hand holding the device is used for interaction with the capture areas. Such user dissatisfaction can lead to lost revenue and lost customers if the user decides to change devices or applications.

Figure 4:
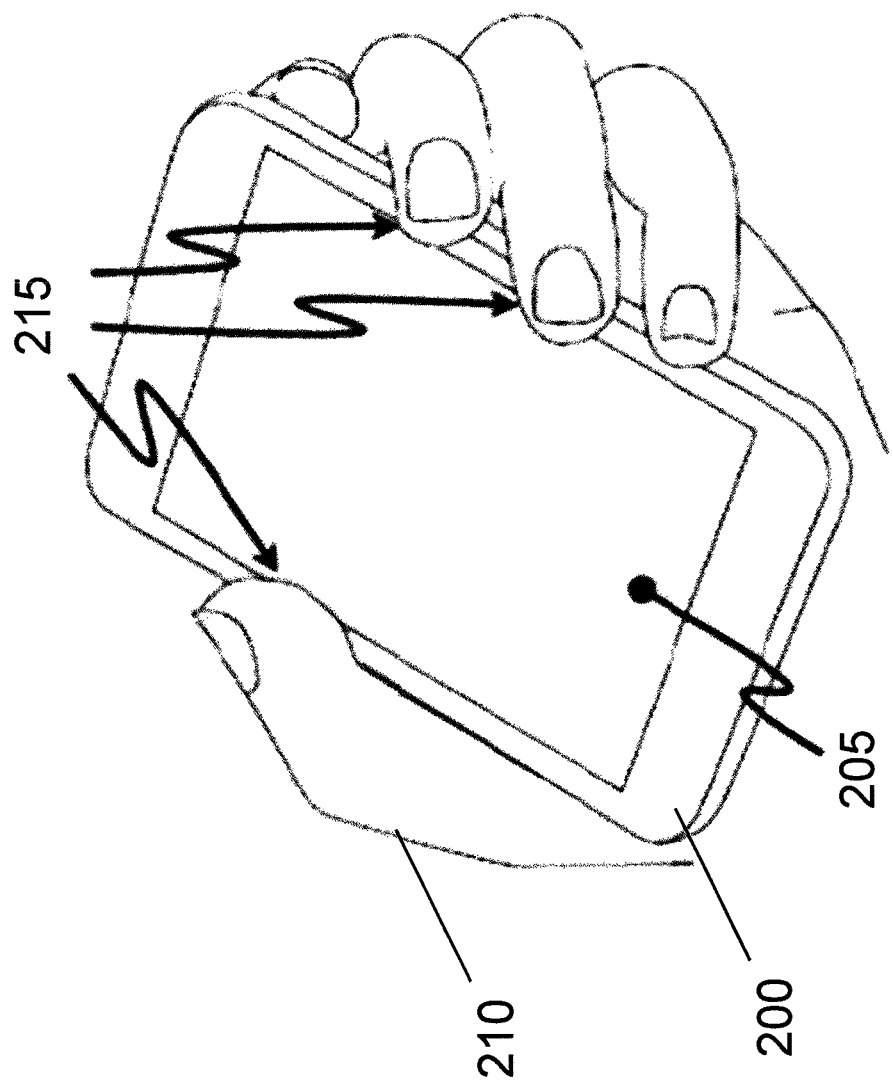
FIG. 4 is an illustration of potentially erroneous input on a touch screen interface of a device.

FIG. 4 illustrates an example embodiment of a device 200 held by the hand 210 of a user. The touch screen interface 205 occupies the majority of the surface of the device, such that a hand 210 firmly grasping the device 200 may produce accidental touches 215 proximate edges of the touch screen interface 205. Accidental touching of a capture area proximate an edge of the touch screen interface 205 is one issue; however, as user interfaces may be configured to recognize only a first touch input, an accidental touch received and held proximate an edge of the touch screen interface 205 may preclude subsequent touches from being recognized by the device 200.

One advantage of touch screens is the ability to receive input with zero-activation force; however, this also causes touch screens to be more susceptible to unintentional inputs received at capture areas as illustrated in FIG. 4. Physical buttons require some level of force to trigger the interaction and are thus more resilient to accidental activation. Therefore, it may be desirable to improve the user interface by reducing unintended inputs that are accidentally received by a touch screen interface.

Example embodiments of the present invention provide a mechanism to reduce or eliminate unwanted, unintended, or accidental user inputs received as touches on a touch-screen display. Example embodiments introduce a touch mediation function which may receive an indication of a first touch event, receive an indication of a second touch event, and determine which, if either of the touch events is more likely to be accurate before providing the touch event to the user interface of an application.

One example embodiment of the touch mediation function may include a touch event filtering map layer for each user interface, that is, a touch event filtering map layer for each available configuration of inputs presented on a display. A single application may have numerous user interfaces. Such a touch event filtering map layer may be defined by the application user interface designer based on the device's physical characteristics and the user interface view layout. The touch event filtering map layer may also define priority areas of the view which segregates the touch screen display into multiple areas with differing priorities based upon the likelihood of unintended or accidental input. When substantially simultaneous touch events occur in the normal-priority area and a low-priority area, the touch events in the normal-priority area may be passed to the underlying user interface components of the application, regardless of which touch event occurred first. Thus, touch events in a higher priority area may take precedence over touch events in lower priority areas.

Figure 5B:
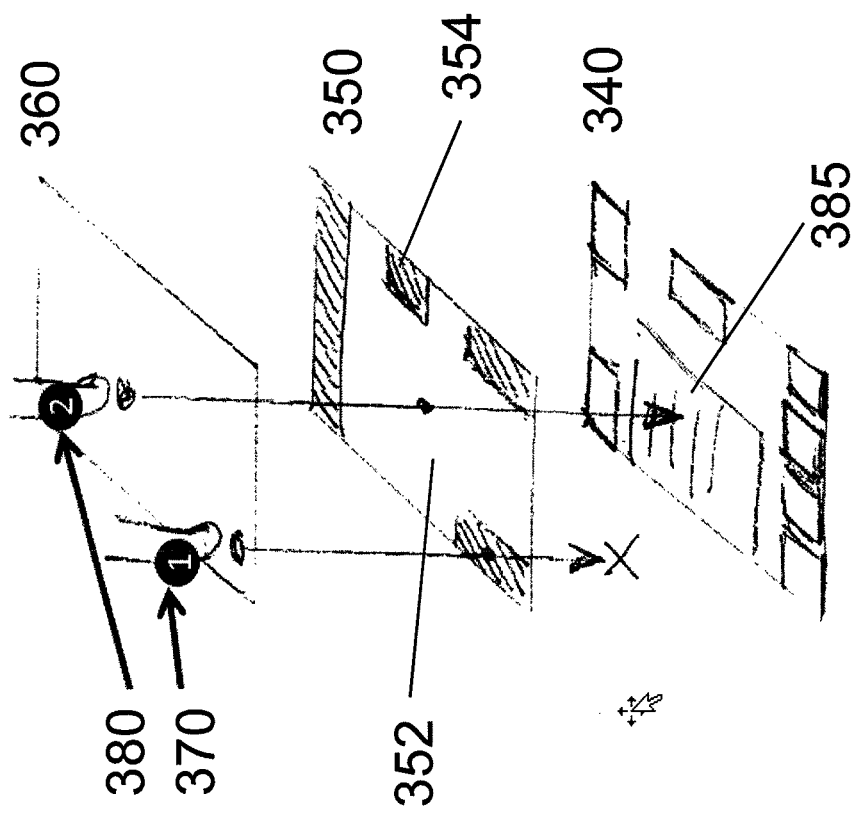
FIG. 5B is an illustration of a touch screen interface configured to send touch events to a touch mediation function including a touch event filtering map layer according to an example embodiment of the invention.
Figure 5A:
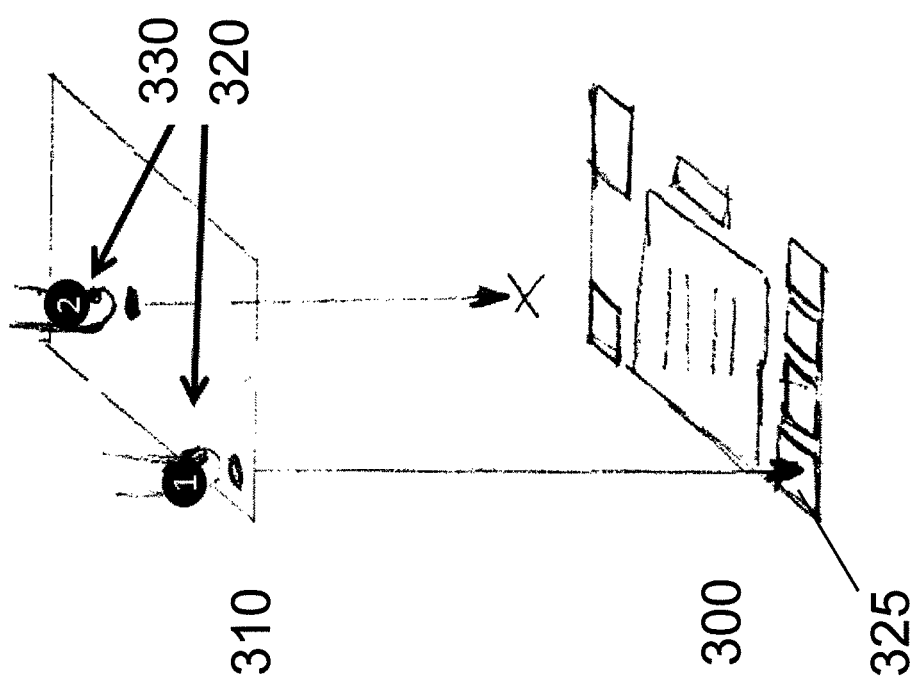
FIG. 5A is an illustration of a touch screen interface configured to send touch events to the user interface directly.

FIGS. 5A and 5B illustrate an example embodiment of a device implementing a touch event filtering map layer compared with a device employing a conventional user interface. FIG. 5A illustrates a touch screen interface 310 and the underlying user interface 300 associated with an application. An input received at the touch screen 310 is received by the user interface 300 and the input is received by the application corresponding to the user interface. Generally, the first user input 320 received as a touch event on the touch screen interface 310 is received directly by the user interface 300 and the input corresponding to the capture area 325 that was touched is received by the application that is displaying the user interface 300. Generally, for the duration of the first touch event 320, subsequent touch events (e.g., second touch event 330) are ignored by the user interface 300 and the input corresponding to the capture area of the second touch event 330 is not received by the application. When the first touch event 320 is complete, another touch event may occur and be received by the user interface.

FIG. 5B illustrates an example embodiment of the present invention including a touch mediation function comprising a touch event filtering map layer. The touch event filtering map layer 350 is depicted as a layer between the touch screen interface 360 and the user input 340; however, the touch event filtering map layer 350 may not be a physical layer and may be shown here only as a representation of the function of the touch event filtering map layer. The touch event filtering map layer 350 may include areas of high priority 352 and areas of low priority 354, generally represented as the shaded areas of the layer. As noted above, the touch event filtering map layer may be dependent upon the application to which the user interface 340 belongs and may be developed by the developer of the application. Optionally, the touch event filtering map layer may be device dependent and be developed specifically for the device, such as a device which includes a particularly high level of accidental touch events in sensitive areas, such as proximate where a user's hand rests when holding the device.

In example embodiments of the invention, a touch event 370 received at the touch screen interface 360 may not immediately translate to an input at the user interface 340. The touch event filtering map 350 may recognize the first touch event 370 as occurring within a low-priority area 354 of the user interface 385 such that a delay may be introduced between the touch event and the input received at the user interface. During such a delay, subsequent touches may be considered by the touch mediation function. For example, subsequent to the first touch event 370 received at the touch screen interface 360, a second touch event 380 may occur on the touch screen interface. The second touch event 380 may be directed to a portion of touch event filtering map 350 that is a high priority area 352. The touch mediation function employing the touch event filtering map 350 may recognize that the second touch event 380 is of a higher priority than the first touch event 370 and may ignore the first touch event 370 while providing the second touch event 380 to the capture area 385 of the user interface 340 to be used as an input for the application providing the user interface.

Touch event filtering map layers according to embodiments of the present invention may also be used to ignore touch events that have occurred on low priority areas of the map layer for less than a predefined amount of time. For example, a brief touch event at a location of the touch screen interface corresponding to a low priority area of the touch event filtering map layer may be ignored while a longer, more sustained press of a touch event at a location of the touch screen interface corresponding to a low priority area may be forwarded to the user interface as a valid input. Similarly, a touch event exceeding a predefined amount of time may be considered to be an accidental touch-and-hold when it occurs at an area of a touch screen interface corresponding to a low priority area of the touch event filtering map layer. A touch event that is determined to be an accidental touch-and-hold (e.g., a touch event exceeding a predefined amount of time) may be ignored by the touch mediation function to allow subsequent touch events to occur without interruption.

Touch event filtering map layers of the touch mediation function may also apply other filters to better interpret user input and minimize erroneous touch events. For example, touch events occurring in low priority areas that exceed a pre-defined time limit may be classified as erroneous and rejected. Touch events in low priority areas that move along a path longer than a predefined distance, such as e.g. 10 millimeters, may be classified as erroneous and rejected. Touch events in low priority areas that have a movement path to absolute press-release distance ratio of about 0.6 may be classified as erroneous and rejected (e.g., touch events that loop around while a finger is in contact with the touch screen interface). Touch events in the low priority area that move above a predefined speed or frequency may be classified as erroneous and rejected.

Additionally or alternatively, touch events including hovering inputs recognized by the device may be used to distinguish erroneous touch events from intended touch events. For example, whether the hovering input is recognized by the device as a touch event, the dwell time of hovering during a touch event may be considered in determining whether a touch event is erroneous or not. For example, if a touch event of a physical touch is received after the device recognizes that hovering has occurred for a predetermined time (e.g., one second or more) prior to the physical touch, the touch event may be considered likely to be erroneous as the user demonstrated hesitation prior to the touch event. A time delay may then be used between the touch event being received and the touch event being sent to the user interface of the application to allow user correction or canceling of the touch event. As such, the presence of a hovering input and/or the duration of a hovering input recognized by a device may be a contributing factor in the determination of whether a touch event is erroneous or not. As described herein, a user may make unintended or accidental touches and embodiments of the present invention are configured to determine that these touch events are accidental or unintended and classify them as erroneous.

While the touch event filtering map layer has been described with high and low priority areas, areas within the touch event filtering map layer may be configured with any level of priority varying from low to high such that the number of priority levels is limitless. The arrangement of the high and low priority areas of the touch event filtering map layer may be configured based upon the likelihood of an accidental touch in an area and/or based upon the frequency with which particular inputs are used. For example, a frequently used input may include a capture area that corresponds to a high-priority area of the touch event filtering map layer regardless of where the capture area falls within the touch screen interface. Optionally, a frequently used input may include a capture area that corresponds to a low-priority area of the touch event filtering map layer if the capture area falls within an area of the touch screen interface that frequently receives accidental touches, such as proximate an edge of the touch screen display. Thus, the high and low priority areas of a touch event filtering map layer may be configured based upon the device, the application user interface, or a combination thereof.

Additionally, the priority of an area of the touch event filtering map layer may be determined, at least in part, by the proximity of the capture area to other capture areas and the priority corresponding to adjacent capture areas. Referring back to the example of FIG. 3, the keypad 115 includes a plurality of capture areas that are each adjacent to one another. Capture areas corresponding to more frequently used letters and/or symbols may correspond to a higher priority area of the touch event filtering map layer while less frequently used letters and/or symbols may be afforded a lower priority.

The priority level of areas of the touch event filtering map layer may include touch prioritization parameters that may be defined by the user interface developer or be device dependent. When a touch screen interface receives a touch event, how that touch event is processed may be dependent upon the prioritization defined via the mediation function.

In an example embodiment, a user interface of an application used to set the time of a clock may typically result in a large number of accidental touches due to various factors, such as the device grip needed to interact with the component, the range of motion required to interact with the component, etc. When a capture area for a particular input to the user interface is added to the user interface, the application may be aware of the propensity for the input or the chosen location of the capture area to receive accidental touches. The touch event filtering map layer may adapt surrounding capture areas in view of the high propensity for accidental inputs at the new capture area. The existing, surrounding capture areas may then have their priorities altered in the touch event filtering map layer based upon the likelihood of accidental or unintended touch events. For example, surrounding capture areas may require a longer touch event before sending the touch event to the user interface to perform the input of the capture area. Optionally, the delay between the touch event occurring (e.g., at touch screen 68) and the touch mediation function sending the touch event (e.g., from the touch screen interface) to the user interface of the application may be increased to allow additional time for a user to correct an unintended input classified by embodiments of the present invention as erroneous.

A touch event which is determined to be erroneous, either by virtue of the touch event filtering map layer or by the touch mediation function classifying the touch event as erroneous (e.g., determining the touch event was accidental or unintended), may be canceled prior to sending the touch event to the user interface or the touch mediation function may send a "cancel" request to the application of the user interface to cancel the erroneous input.

The touch mediation function may evaluate touch events received at other capture areas within the touch screen interface and make a determination as to which touch events are considered accurate and provide only those touch events considered accurate to the user interface of the application for execution of the corresponding input. The touch mediation function may modify or delay the touch event prior to providing the touch event to the user interface. For example, a capture area that is located adjacent to a capture area that receives many unintended touch events may include a delay between receiving a touch event and sending the touch event to the user interface to allow time for the touch event to be canceled or modified by the touch mediation function prior to sending to the user interface of the application.

In addition to filtering accidental or unintended touch events (e.g., by classifying them as erroneous), example embodiments of the invention may be applied to improving the accuracy of touch events. For example, if neighboring capture areas have been found to have touch events received left of the center of the capture area, the capture areas may be adjusted in concert with the capture areas of neighboring components. The mediation function may recognize the touch events occurring in a manner misaligned with the capture areas and adjust the capture areas as needed to reduce the likelihood of erroneous touch events and to improve the accuracy of touch events based upon the user habits.

The touch mediation function may also include a learning function whereby the mediation function and a touch event filtering layer may be dynamically adjusted based upon adaptive learning of a user's habits. For example, the touch mediation function of a device with a user who rarely has touch events that are determined to be erroneous may be adjusted to be less cautious and to err on the side of passing a touch event to the user interface while the touch mediation function of a device with a user who frequently has touch events that are determined to be erroneous may be adjusted to be more cautious and to err on the side of discarding or rejecting a touch event. The touch event filtering layer may be dynamically adjusted for a particular application in response to the frequency with which a user uses particular inputs. For example, a user who frequently uses the "reply all" feature of an E-mail application may have the capture area corresponding to the "reply all" input increase in priority over a user who rarely or never uses the "reply all" feature of an E-mail application.

Example embodiments of the present invention may further include parameters configured to adjust the touch mediation function. For example, if a device is determined to be moving (e.g., via accelerometer sensors such as sensor 31 of FIG. 1), parameters of the touch mediation function may be adjusted to be more cautious in receiving touch events and the touch mediation function may become more likely to discard or reject touch events that are deemed to potentially be erroneous. Other parameters, such as the sensed size of the touch event (e.g., a finger, a thumb, or a stylus) and the general rate of frequency of touch events may be used as parameters to adjust the touch mediation function. For example rapid touch events in succession or touch events of a large size may be regarded by the touch mediation function as more likely to be erroneous.

While the above embodiments have primarily been described with respect to a touch event filtering map layer, example embodiments may include a touch mediation function which is fully contained within the application user input logic which may be configured to receive and interpret inputs in order to appropriately classify unintended or accidental touch events as erroneous. Each user input component, such as a key of keypad 115, at the time of the user input design or dynamically during runtime may scan surrounding user interface components, screen edges, or other factors likely to influence input errors, and adjust the touch event capture parameters such as the capture area for the user interface component. In some embodiments, the user interface components are able to negotiate touch event parameters and capture areas between themselves and may dynamically pass touch events to neighboring components as deemed appropriate. Touch event parameters may include parameters such as minimum touch event time, maximum touch event time, minimum time between touch events, maximum time between touch events, frequency of touch events, maximum drag or movement length during touch event, maximum distance from user interface component, or other parameters which may influence how the touch event is interpreted.

Figure 6:
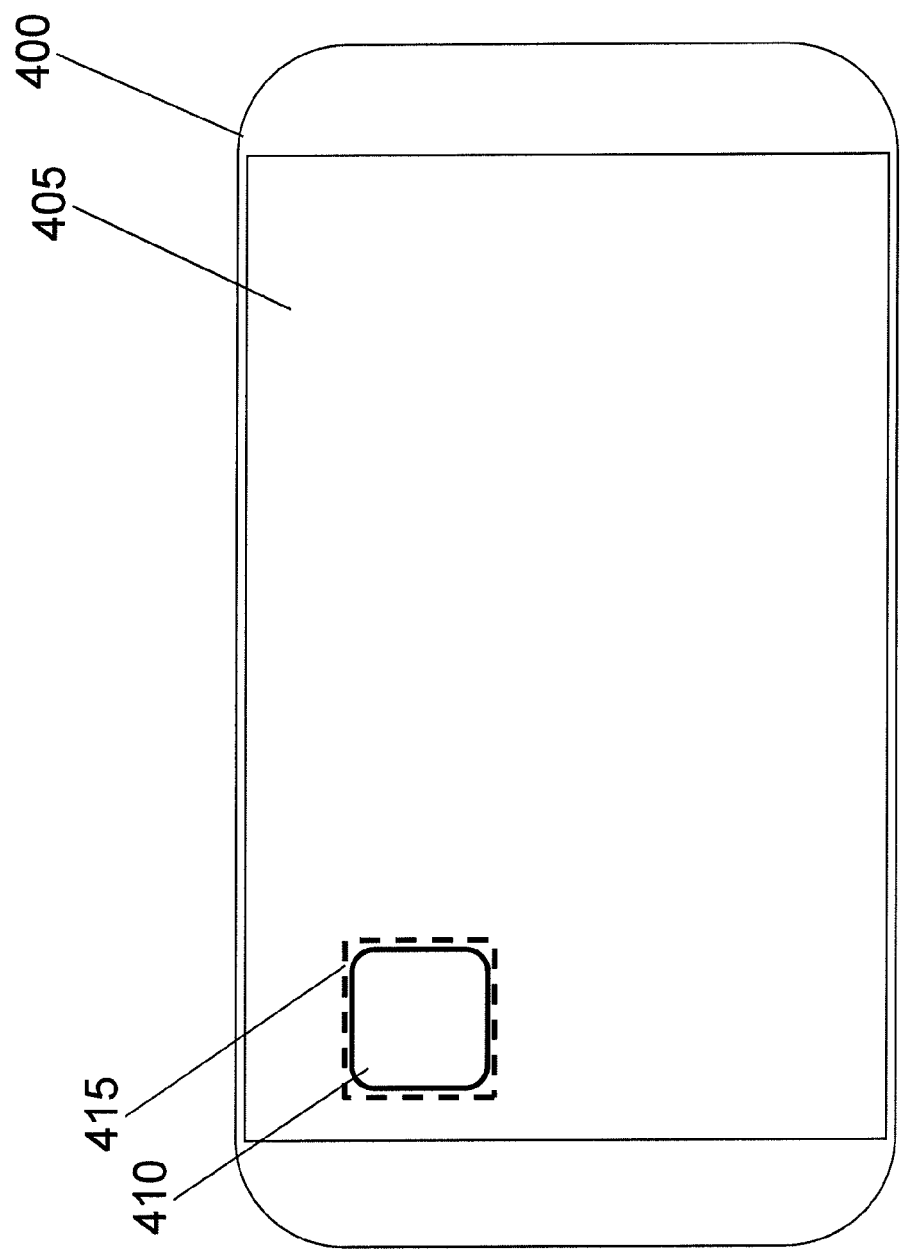
FIG. 6 is an illustration of a device including a user interface component and a capture area according to an example embodiment of the present invention.
Figure 7:
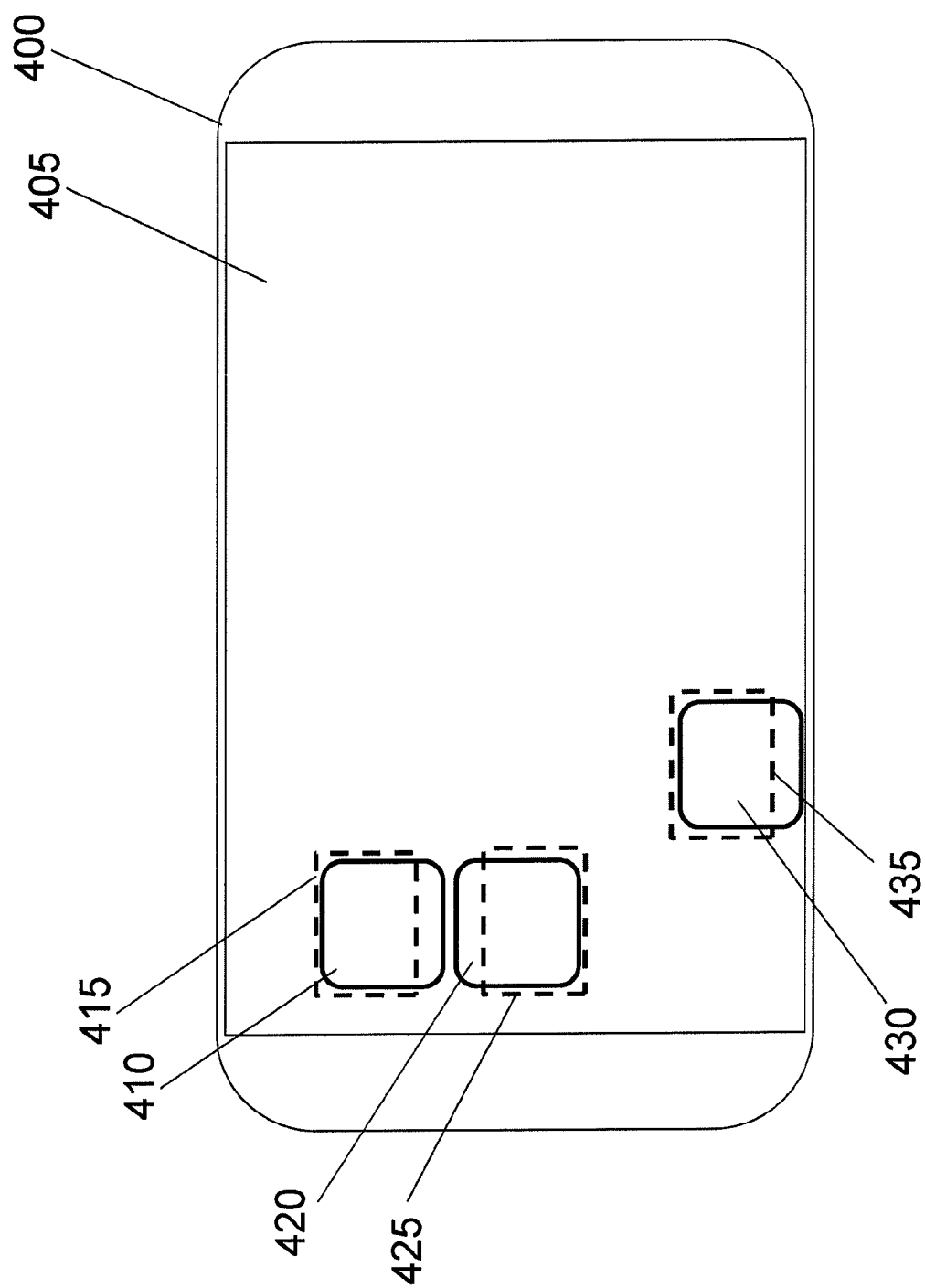
FIG. 7 is an illustration of a device including several user interface components and their respective capture areas according to an example embodiment of the present invention.

FIG. 6 illustrates an example embodiment of a device 400 including a touch screen display 405. User interface component 410 is presented on the display 405 with a touch capture area 415 identified by dashed lines surrounding the user interface component 410. The touch capture area 415 is shown for illustrative purposes and may not be shown on the display 405. The touch capture area 415 may extend beyond the perimeter of the user interface component 410 as the user interface component may be the only input shown on the display or may not have neighboring user interface components which may receive an input. Either during design of the user interface, or dynamically during operation of the application presenting the user interface, another user interface component 420 may be added as shown in FIG. 7. In response to the second user interface component 420 being placed proximate the first user interface component 410, either during design of the user interface or dynamically during application runtime, the capture area 415 of the first user interface component 410 may be adjusted and touch event parameters, such as minimum touch time, may be changed to reduce the likelihood of a touch event that is classified as erroneous at the first user interface component 410. The capture area 425 and touch event parameters of the second user interface component 420 may be similarly adjusted or initially set to values corresponding to the second user interface component 420 being located near another user interface component.

Further illustrated in the example embodiment of FIG. 7 is a user interface component 430 which is placed proximate an edge of the display 405. The touch capture area 435 of the third user interface component 430 may be adjusted due to the placement proximate the edge of the display in order to reduce the likelihood of a touch event that may be classified as erroneous received at the edge of the display 405.

FIGS. 8-11 are flowcharts of methods and program products according to example embodiments of the invention. It will be understood that each block of the flowcharts, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user device and executed by a processor in the user device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a non-transitory computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Figure 8:
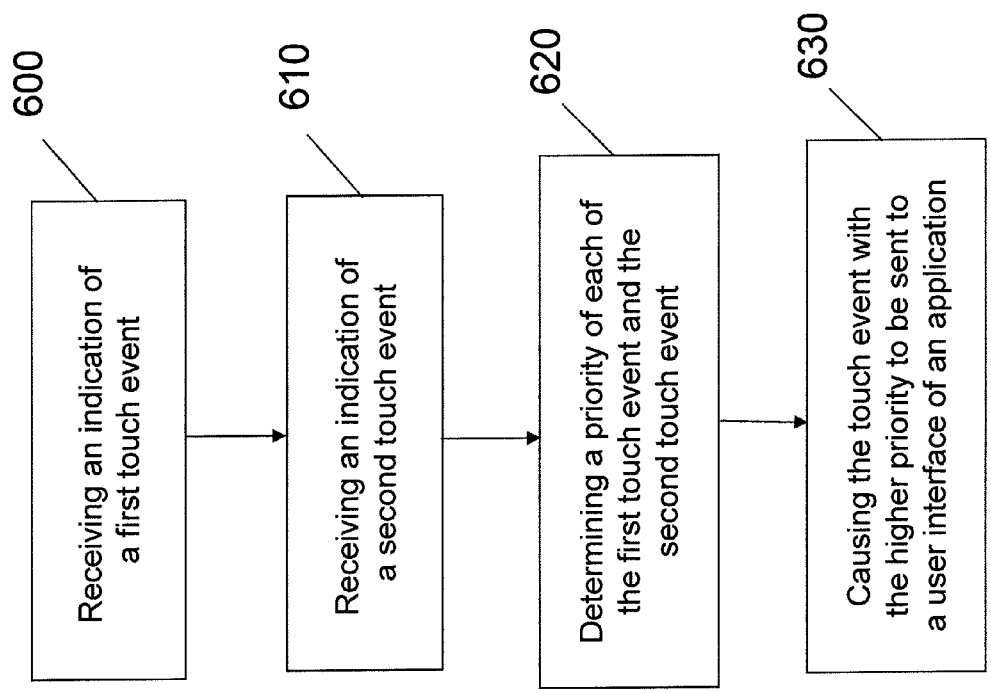
FIG. 8 is a flowchart of a method for interpreting user input and mitigating erroneous input according to an example embodiment of the present invention.

In this regard, a method according to one embodiment of the invention, as shown in FIG. 8, may include receiving an indication of a first touch event at 600 and receiving an indication of a second touch event at 610. The priority of each of the first touch event and the second touch event may be determined at 620 by, for example, a touch mediation function which may be embodied as the touch screen interface 80 of the user input interface 72 of FIG. 2 The touch event with the higher priority may be sent to a user interface of an application at 630.

In some embodiments, certain ones of the operations above may be modified or further amplified as described below. Moreover, in some embodiments additional optional operations may also be included. It should be appreciated that each of the modifications, optional additions or amplifications below may be included with the operations above either alone or in combination with any others among the features described herein. With reference to the method of FIG. 8, in some example embodiments, the first touch event may occur proximate a first capture area for a user interface component, and the method may include causing the first capture area for the user interface component to be adjusted in response to the first touch event. Determining a priority for each of the first touch event and the second touch event may occur in response to the second touch event occurring within a predetermined amount of time of the first touch event. The first touch event may be directed to a first capture area and the second touch event may be directed to a second capture area that is different that the first capture area. The first capture may correspond to a first priority area and the second capture area may correspond to a second priority area, where the priority of the first touch event corresponds to the priority of the first priority area and the priority of the second touch event corresponds to the priority of the second priority area. The touch mediation function may include a touch event map layer, where the touch event map layer includes at least two priority levels mapped to at least two areas of a touch screen interface. The first touch event may correspond to first prioritization parameters and the second touch event may correspond to second prioritization parameters.

Figure 9:
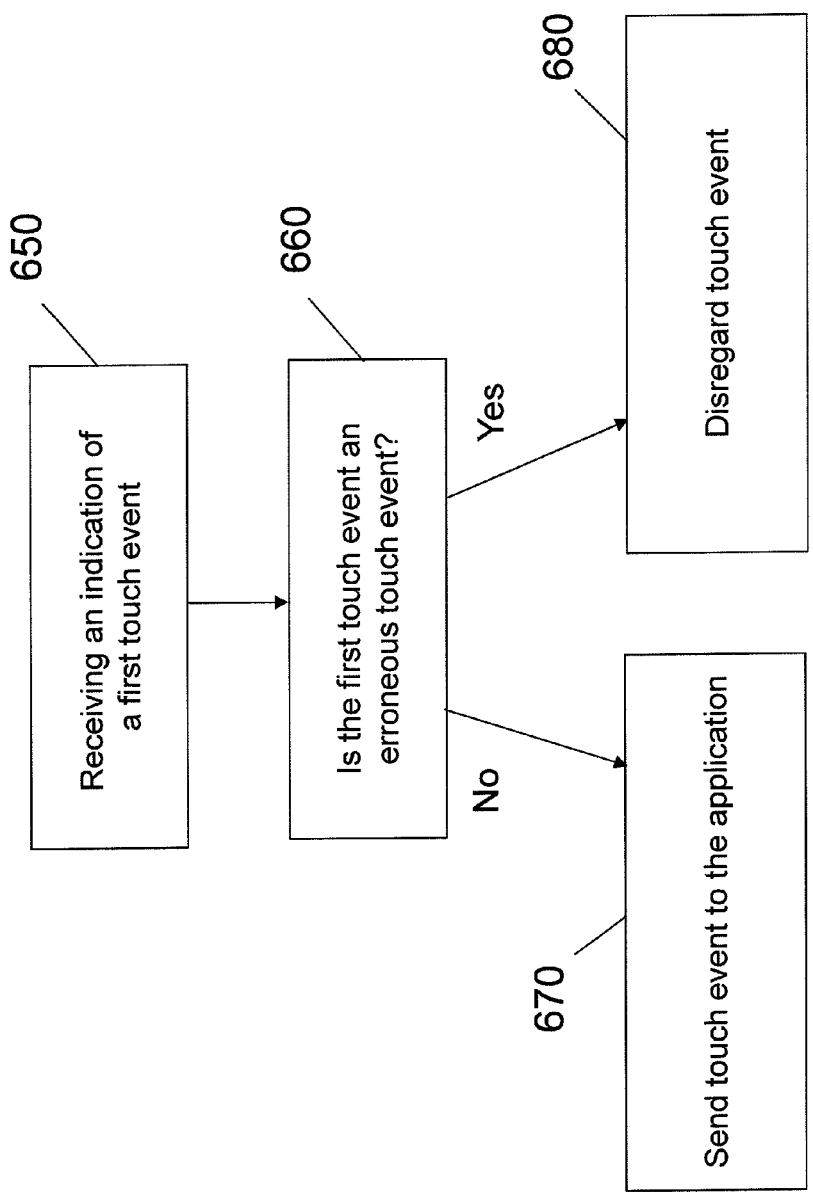
FIG. 9 is a flowchart of a method for interpreting user input and mitigating erroneous input according to another example embodiment of the present invention.

A method according to another embodiment of the invention, as shown in FIG. 9 may include receiving an indication of a first touch event at 650. At 660 a determination is made as to whether the touch event is erroneous through use of a touch mediation function. If the touch event is erroneous, the touch event is disregarded at 680. However, if the touch event is not erroneous, the touch event is sent to the application via the user interface at 670.

In some embodiments, certain ones of the operations above may be modified or further amplified as described below. With reference to the method of FIG. 9, in some example embodiments, the first touch event may occur proximate a first capture area for the user interface and the first capture area may be adjusted in response to the first touch event. The method may include receiving an indication of a second touch event, where the touch mediation function may assign a priority to each of the first touch event and the second touch event and the touch event with the lower priority may be discarded. The indication of the second touch event may be received within a predetermined time of receiving the indication of the first touch event. The first touch event may be received at a first capture area corresponding to a first priority area and the second touch event may be received at a second capture area corresponding to a second priority area, where the priority of the first touch event corresponds to the priority of the first priority area and the priority of the second touch event corresponds to the priority of the second priority area. The touch mediation function may include a touch event map layer and the touch event map layer may include at least two priority levels mapped to at least two areas of a touch screen interface.

In an example embodiment, an apparatus for performing the method of FIG. 8 or 9 above may comprise a processor (e.g., the processor 70) configured to perform some or each of the operations (600-630 and/or 650-680) described above. The processor 70 may, for example, be configured to perform the operations (600-630 and/or 650-680) by performing hardware implemented logical functions, executing stored instructions, or executing algorithms for performing each of the operations. Alternatively, the apparatus may comprise means for performing each of the operations described above.

An example of an apparatus according to an example embodiment may include at least one processor and at least one memory including computer program code. The at least one memory and the computer program code may be configured to, with the at least one processor, cause the apparatus to perform the operations 600-630 and/or 650-680 (with or without the modifications and amplifications described above in any combination).

An example of a computer program product according to an example embodiment may include at least one computer-readable storage medium having computer-executable program code portions stored therein. The computer-executable program code portions may include program code instructions for performing operations 600-630 and/or 650-680 (with or without the modifications and amplifications described above in any combination).

Figure 10:
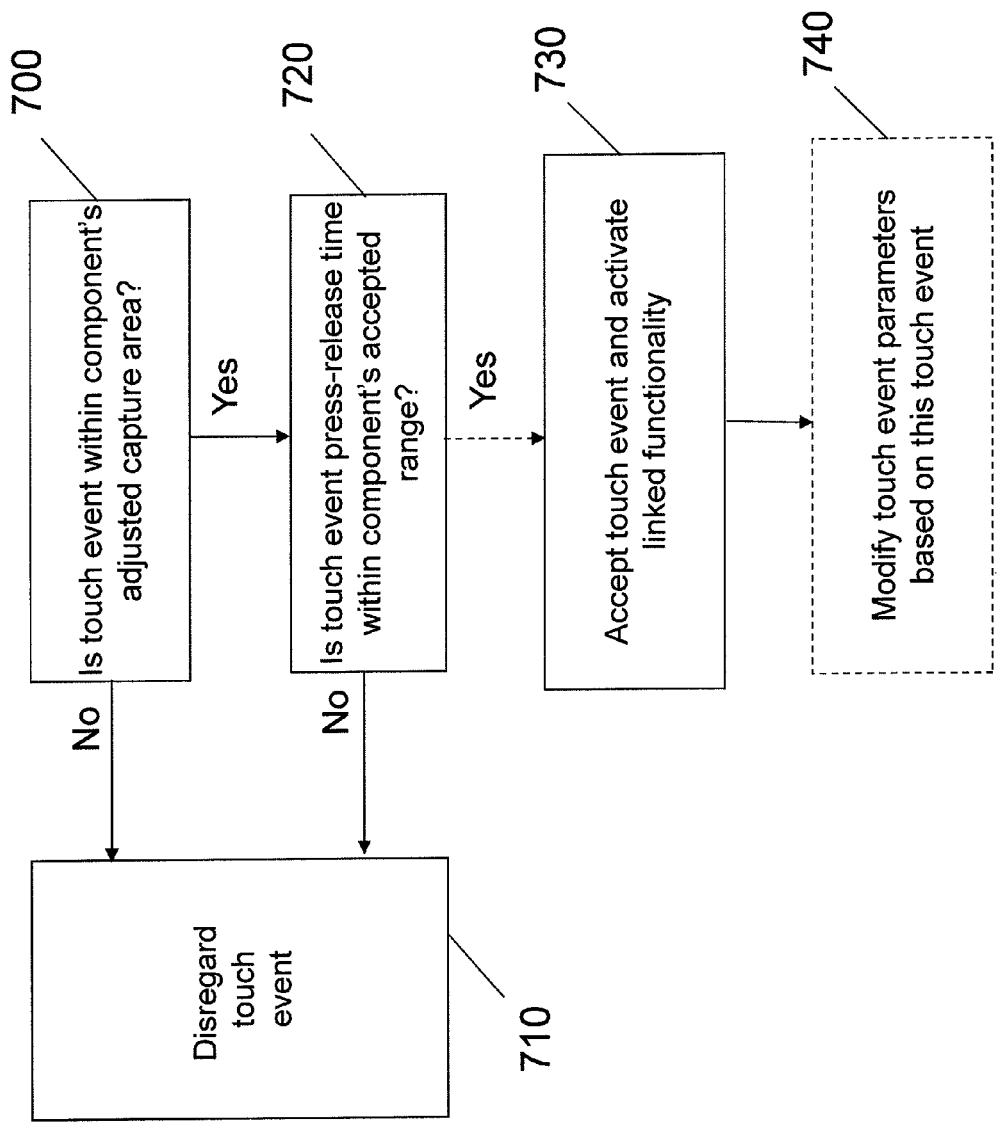
FIG. 10 is a flowchart of a method for interpreting user input and erroneous input according to still another example embodiment of the present invention.

FIG. 10 is a flowchart of another method and program product according to example embodiments of the invention. A touch event may be received and a determination may be made at 700 whether the touch is within the user interface component's adjusted capture area. If the touch event is outside the capture area, the touch is disregarded at 710. If the touch is within the capture area, a determination is made at 720 whether the press-release time of the touch event is within the user interface component's accepted range. For example, if a press is too long or too short, it may be discarded. If the touch event is outside the component's accepted range, the touch is discarded at 710. If the touch is within the acceptable press-release range for the user interface component, further such verifications may occur with respect to other touch event parameters required by the user input component until the touch event is determined to be acceptable or unacceptable. If the touch event is acceptable, the touch event may be accepted by the user interface and the input linked to the user interface component may be activated at 730. If the touch event comprises information from which the user interface may learn (e.g., the location of the touch event within the capture area, the duration of the event, etc.) the touch event parameters may be adjusted at 740 for dynamic learning of the touch event parameters.

Figure 11:
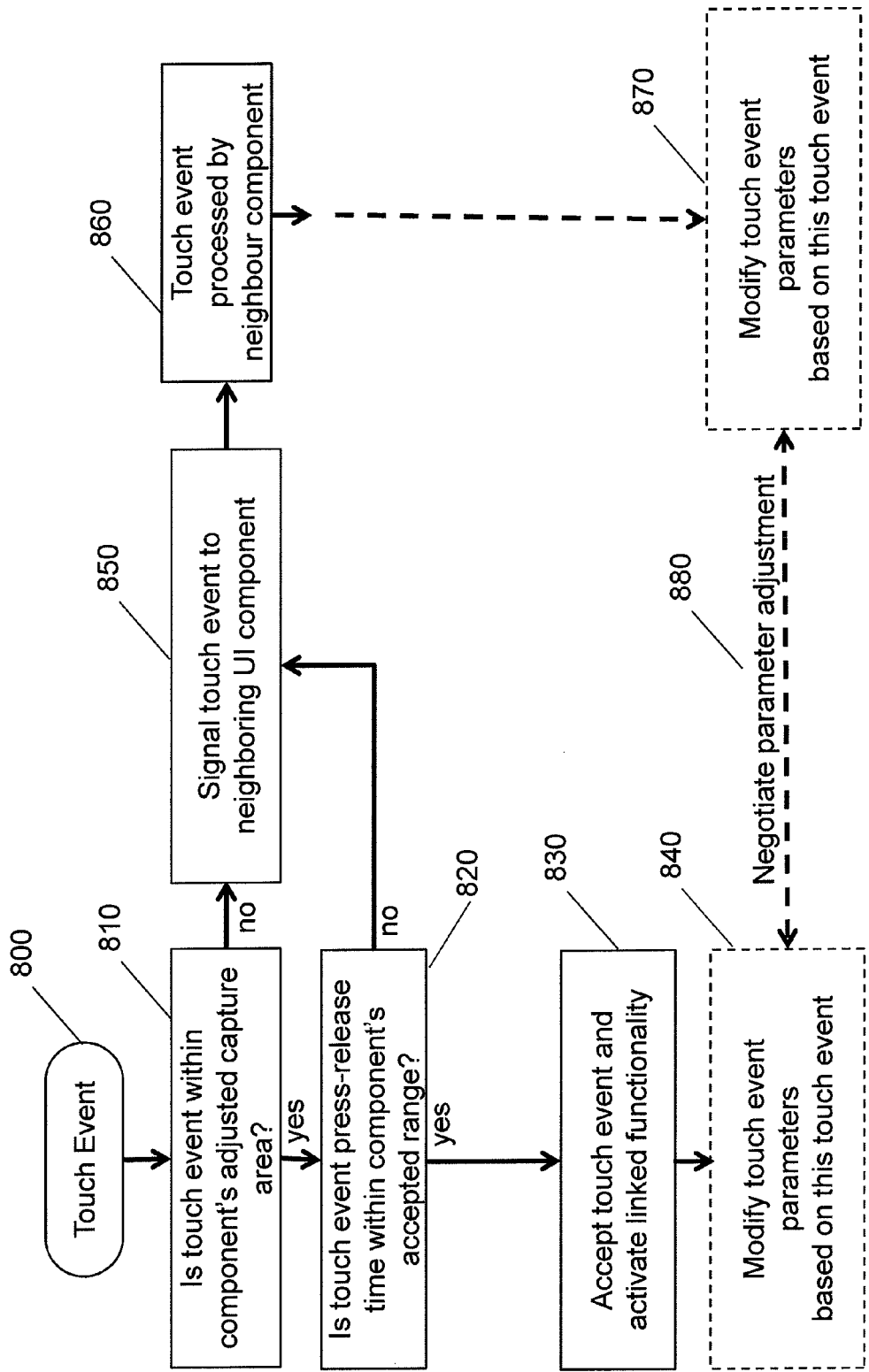
FIG. 11 flowchart of a method for interpreting user input and erroneous input according to yet another example embodiment of the present invention.

In some example embodiments of the present invention, a user interface may be adapted to convey touch events received at a first user interface component to a neighboring user interface component during a touch event that is determined to be appropriate for a neighboring user interface component. FIG. 11 illustrates an example embodiment of such a method where a touch event is received at 800. A determination is made at 810 as to whether the touch event is within the component's adjusted capture area. If the touch event occurred within the adjusted capture area, the touch event press-release time may be evaluated at 820, similar to the method of FIG. 10. If the touch event is acceptable at the user interface component, the touch event is accepted at 830. The touch event parameters for the user interface component may be modified at 840 in response to the touch event. If the touch event is determined to be outside of the capture area of the user interface component at 810 or if the touch event press-release time is outside of the acceptable range, the touch event may be signaled to a neighboring user interface component at 850. The touch event may be processed by the neighboring user interface component at 860 using the same operations as the method of FIG. 9 and operations 810-830. At operation 870, the neighboring touch event may alter touch event parameters based on the touch event and further, the user interface component and the neighboring user interface component may negotiate parameter adjustment in order to better recognize future touch events at 880.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe some example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
    receiving an indication of a first touch event, wherein the first touch event is assigned a first touch event priority in response to being received at a first capture area corresponding to a first priority;
    receiving an indication of a second touch event, wherein the second touch event is assigned a second touch event priority in response to being received at a second capture area corresponding to a second priority;
    determining, by a touch mediation function, that either the first touch event or the second touch event that comprises a lower priority is an erroneous touch event;
    causing either the first touch event or the second touch event that comprises a higher priority to be sent to an application in response to the touch mediation function determining that the respective first touch event or the second touch event is not erroneous; and
    causing the first touch event or the second touch event comprising the lower priority to not be sent to the application in response to the touch mediation function determining that the respective first touch event or the second touch event is erroneous.

2. The method according to claim 1, wherein the first touch event occurs proximate a first capture area for a user interface, and wherein the method further comprises causing the first capture area for the user interface to be adjusted in response to the first touch event.

3. The method according to claim 1, wherein the touch mediation function comprises a touch event map layer, and wherein the touch event map layer comprises at least two priority levels mapped to at least two areas of a touch screen interface.

4. The method according to claim 1, further comprising adjusting a touch event parameter of at least one user interface component in response to receiving the first touch event.

5. The method of claim 1, wherein the first capture area comprises a region of a display with a relatively higher likelihood of accidental input, and wherein the first capture area corresponds to a relatively low priority in response to being a region with a relatively higher likelihood of accidental input.

6. The method of claim 5, wherein the second capture area comprises a region of a display with a relatively lower likelihood of accidental input, and wherein the second capture area corresponds to a relatively higher priority area in response to being a region with a relatively lower likelihood of accidental input.

7. The method of claim 1, wherein the first capture area and the second capture area are defined by an application user interface.

8. An apparatus comprising at least one processor and at least one memory including computer program code, the at least one memory and the computer program code configured to, with the at least one processor, cause the apparatus to:
    provide for receiving an indication of a first touch event, wherein the first touch event is assigned a first touch event priority in response to being received at a first capture area corresponding to a first priority;
    receive an indication of a second touch event, wherein the second touch event is assigned a second touch event priority in response to being received at a second capture area corresponding to a second priority;
    provide for determining, by a touch mediation function, that either the first touch event or the second touch event that comprises a lower priority is an erroneous touch event;
    provide for causing either the first touch event or the second touch event that comprises higher priority area to be sent to an application in response to the touch mediation function determining that the respective touch event or the second touch event is not erroneous; and
    provide for causing the first touch event or the second touch event comprising the lower priority to not be sent to the application in response to the touch mediation function determining that the respective first touch event or the second touch event is erroneous.

9. The apparatus according to claim 8, wherein the first touch event occurs proximate a first capture area for a user interface, and wherein the apparatus is further caused to provide for adjusting the first capture area for the user interface to in response to the first touch event.

10. The apparatus according to claim 8, wherein the touch mediation function comprises a touch event map layer, and wherein the touch event map layer comprises at least two priority levels mapped to at least two areas of a touch screen interface.

11. The apparatus according to claim 8, wherein the apparatus is further caused to adjust a touch event parameter of at least one user interface component in response to receiving the first touch event.

12. The apparatus of claim 8, wherein the first capture area comprises a region of a display with a relatively higher likelihood of accidental input, and wherein the first capture area corresponds to a relatively low priority area in response to being a region with a relatively higher likelihood of accidental input.

13. The apparatus of claim 12, wherein the second capture area comprises a region of a display with a relatively lower likelihood of accidental input, and wherein the second capture area corresponds to a relatively higher priority area in response to being a region with a relatively lower likelihood of accidental input.

14. The apparatus of claim 8, wherein the first capture area and the second capture area are defined by an application user interface.

15. A computer program product comprising at least one non-transitory computer-readable storage medium having computer-executable program code instructions stored therein, the computer-executable program code instructions comprising:
    program code instructions for receiving an indication of a first touch event, wherein the first touch event is assigned a first touch event priority in response to being received at a first capture area corresponding to a first priority;
    program code instructions for receiving an indication of a second touch event, wherein the second touch event is assigned a second touch event priority in response to being received at a second capture area corresponding to a second priority;

program code instructions for determining, by a touch mediation function, that either the first touch event or the second touch that comprises a lower priority area is an erroneous touch event;

program code instructions for causing either the first touch event or the second touch event that comprises a higher priority to be sent to an application in response to the touch mediation function determining that the respective first touch event or the second touch event is not erroneous; and program code instructions for causing the first touch event or the second touch event that comprises the lower priority to not be sent to the application in response to the touch mediation function determining that the respective first touch event or the second touch event is erroneous.

16. The computer program product according to claim 15, wherein the first touch event occurs proximate a first capture area for a user interface, and wherein the computer program product further includes program code instructions for causing the first capture area for the user interface to be adjusted in response to the first touch event.

17. The computer program product according to claim 15, wherein the touch mediation function comprises a touch event map layer, and wherein the touch event map layer comprises at least two priority levels mapped to at least two areas of a touch screen interface.

18. The computer program product of claim 15, wherein the first capture area comprises a region of a display with a relatively higher likelihood of accidental input, and wherein the first capture area corresponds to a relatively low priority area in response to being a region with a relatively higher likelihood of accidental input.

19. The computer program product of claim 18, wherein the second capture area comprises a region of a display with a relatively lower likelihood of accidental input, and wherein the second capture area corresponds to a relatively higher priority area in response to being a region with a relatively lower likelihood of accidental input.

20. The computer program product of claim 15, wherein the first capture area and the second capture area are defined by an application user interface.

* * * * *